United States Patent
Ishida et al.

(10) Patent No.: US 11,952,821 B2
(45) Date of Patent: Apr. 9, 2024

(54) CONTROL DEVICE FOR VEHICLE AND VEHICLE

(71) Applicant: TOYOTA JIDOSHA KABUSHIKI KAISHA, Toyota (JP)

(72) Inventors: Naoya Ishida, Chiryu (JP); Kentaro Oya, Toyota (JP); Takashi Yuma, Toyokawa (JP); Chihiro Date, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/570,779

(22) Filed: Jan. 7, 2022

(65) Prior Publication Data

US 2022/0268079 A1   Aug. 25, 2022

(30) Foreign Application Priority Data

Feb. 25, 2021   (JP) .................................. 2021-028077

(51) Int. Cl.
*E05F 15/70* (2015.01)
*B60P 1/43* (2006.01)

(52) U.S. Cl.
CPC .............. *E05F 15/70* (2015.01); *B60P 1/431* (2013.01); *E05Y 2400/44* (2013.01); *E05Y 2400/52* (2013.01); *E05Y 2900/531* (2013.01)

(58) Field of Classification Search
CPC ...... E05F 15/70; B60P 1/431; E05Y 2400/44; E05Y 2400/52; E05Y 2900/531; F16H 2035/005; F16H 2312/00

USPC .......................................................... 701/49
See application file for complete search history.

(56) References Cited

U.S. PATENT DOCUMENTS

| | | | | |
|---|---|---|---|---|
| 6,178,699 B1 * | 1/2001 | Kawanobe | ............ | E05F 15/646 49/31 |
| 7,698,855 B2 * | 4/2010 | Imai | ...................... | E05F 15/632 49/360 |
| 2002/0180237 A1 * | 12/2002 | Rogers | .................. | E05F 15/643 296/155 |
| 2003/0098211 A1 * | 5/2003 | Saito | .................... | B60R 16/0315 191/3 |
| 2003/0187561 A1 * | 10/2003 | Shimaguchi | ........ | F16H 61/0059 701/67 |
| 2006/0232100 A1 * | 10/2006 | Kamiya | ..................... | B60J 5/06 296/147 |

(Continued)

FOREIGN PATENT DOCUMENTS

| | | | | | |
|---|---|---|---|---|---|
| EP | 1758223 A2 * | 2/2007 | | ............. | E05F 15/41 |
| EP | 1826883 A2 * | 8/2007 | | .......... | H02H 7/0851 |

(Continued)

*Primary Examiner* — Tuan C To
(74) *Attorney, Agent, or Firm* — Dinsmore & Shohl LLP (57) ABSTRACT

A control device is mounted on a vehicle including a door opening and closing mechanism for opening and closing a door of an entrance and exit where a passenger gets on and off, and a shift device for changing a driving range of a transmission. The driving range is input to the control device and the control device opens and closes the door by the door opening and closing mechanism. The control device permits opening of the door when the driving range is a parking range, and prohibits a change of the driving range of the shift device when the driving range is the parking range and the door is open.

6 Claims, 7 Drawing Sheets

(56) References Cited

U.S. PATENT DOCUMENTS

| | | | |
|---|---|---|---|
| 2006/0232393 A1* | 10/2006 | Kimura | F16H 61/32 340/456 |
| 2009/0033256 A1* | 2/2009 | Kamiya | B60J 5/06 49/31 |
| 2009/0302637 A1* | 12/2009 | Iijima | E05F 15/632 296/155 |
| 2014/0350806 A1* | 11/2014 | Koike | B60W 10/11 701/53 |
| 2015/0346718 A1* | 12/2015 | Stenneth | G05D 1/0282 701/2 |
| 2016/0076645 A1* | 3/2016 | Terai | F16H 61/12 701/58 |
| 2017/0259850 A1* | 9/2017 | Yamashita | B62D 6/00 |
| 2017/0309092 A1* | 10/2017 | Rosenbaum | G01M 17/007 |
| 2019/0193620 A1 | 6/2019 | Matsuoka et al. | |
| 2021/0179072 A1* | 6/2021 | Yamanaka | B62D 15/0285 |

FOREIGN PATENT DOCUMENTS

| | | |
|---|---|---|
| JP | 05-050852 A | 3/1993 |
| JP | H08-025998 A | 1/1996 |
| JP | 2019-015347 A | 1/2019 |
| JP | 2019-116112 A | 7/2019 |

* cited by examiner

CONTROL DEVICE FOR VEHICLE AND VEHICLE

CROSS-REFERENCE TO RELATED APPLICATION

This application claims priority to Japanese Patent Application No. 2021-028077 filed on Feb. 25, 2021, incorporated herein by reference in its entirety.

BACKGROUND

1. Technical Field

The present disclosure relates to a control device mounted on a vehicle including a shift device for changing a driving range, and a vehicle on which the control device is mounted.

2. Description of Related Art

A vehicle may be equipped with an accelerator interlock mechanism that prohibits the accelerator pedal from being depressed for safety reasons. For example, in order to prevent the vehicle from starting while the door of the vehicle is open, a configuration is disclosed in which a support rod is extended to the lower side of the accelerator pedal in response to a detection signal of opening of the door to prevent the pedal from being depressed (e.g., see Japanese Unexamined Patent Application Publication No. 8-25998 (JP 8-25998 A)).

SUMMARY

In the vehicle provided with the accelerator interlock mechanism as described in JP 8-25998 A, when the door is open, the accelerator cannot be depressed, but the shift position can be changed. Therefore, if the shift position is changed to the drive range or the reverse range while the door is open, the vehicle may start traveling at a slow speed due to creep.

It is therefore an object of the present disclosure to suppress a vehicle from traveling when a door is open.

A control device according to a first aspect of the present disclosure is mounted on a vehicle including a door opening and closing mechanism for opening and closing a door of an entrance and exit where a passenger gets on and off, and a shift device for changing a driving range of a transmission. The driving range is input to the control device and the control device opens and closes the door by the door opening and closing mechanism. The control device permits opening of the door when the driving range is a parking range, and prohibits a change of the driving range of the shift device when the driving range is the parking range and the door is open.

Thus, the change of the driving range of the shift device is prohibited when the driving range is the parking range and the door is in the opened state, thereby prohibiting the operation of the driving range of the transmission from the parking range to other ranges. This can suppress the driving range from being changed to the traveling range, the reverse range, or the like when the door is in the opened state, which suppresses the vehicle from traveling due to creep when the door is in the opened state.

Further, in the control device of the first aspect, when a vehicle speed is input from a vehicle speed sensor mounted on the vehicle, and the driving range is the parking range and the vehicle speed is lower than a predetermined threshold value, the control device may permit the opening of the door.

Therefore, it is possible to reliably detect that the vehicle is in the stopped state, which can suppress misoperation.

The control device of the first aspect may be mounted on the vehicle further including a slope deployment and storage mechanism for deploying and storing a slope that guides the passenger to the entrance and exit, may further perform deployment and storage of the slope by the slope deployment and storage mechanism, may permit the deployment of the slope when the driving range is the parking range, and may prohibit the change of the driving range of the shift device when the driving range is the parking range and the slope is in a deployed state.

Thus, the change of the driving range of the shift device is prohibited when the driving range is the parking range and the slope is in the deployed state, thereby prohibiting the operation of the driving range of the transmission from the parking range to other ranges. This can suppress the driving range from being changed to the traveling range, the reverse range, or the like when the slope is in the deployed state, which suppresses the vehicle from traveling due to creep when the slope is in the deployed state.

In the control device of the first aspect, when a vehicle speed is input from a vehicle speed sensor mounted on the vehicle, and the driving range is the parking range and the vehicle speed is lower than a predetermined threshold value, the control device may permit the deployment of the slope.

Therefore, it is possible to reliably detect that the vehicle is in the stopped state, which can suppress misoperation.

A vehicle according to a second aspect of the present disclosure includes: a door opening and closing mechanism for opening and closing a door of an entrance and exit where a passenger gets on and off; a shift device for changing a driving range of a transmission; and a control device to which the driving range is input and that opens and closes the door by the door opening and closing mechanism. The control device permits opening of the door when the driving range is a parking range, and prohibits a change of the driving range of the shift device when the driving range is the parking range and the door is open.

The vehicle of the second aspect may further include a vehicle speed sensor, and when a vehicle speed is input from the vehicle speed sensor, and the driving range is the parking range and the vehicle speed is lower than a predetermined threshold value, the control device may permit the opening of the door.

Therefore, it is possible to reliably detect that the vehicle is in the stopped state, which can suppress misoperation.

The vehicle of the second aspect may further include a slope deployment and storage mechanism for deploying and storing a slope that guides the passenger to the entrance and exit. The control device may perform deployment and storage of the slope by the slope deployment and storage mechanism, may permit the deployment of the slope when the driving range is the parking range, and may prohibit the change of the driving range of the shift device when the driving range is the parking range and the slope is in a deployed state.

The vehicle of the second aspect may further include a vehicle speed sensor, and when a vehicle speed is input from the vehicle speed sensor, and the driving range is the parking range and the vehicle speed is lower than a predetermined threshold value, the control device may permit the deployment of the slope.

Therefore, it is possible to reliably detect that the vehicle is in the stopped state, which can suppress misoperation.

The aspects of the present disclosure can suppress a vehicle from traveling when a door is open.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENT

Hereinafter, a vehicle 100 according to the embodiment and a control device 40 mounted on the vehicle 100 will be described with reference to the drawings. An arrow FR, an arrow UP, and an arrow RH illustrated in the drawings indicate a forward direction (traveling direction), an upward direction, and a rightward direction of the vehicle 100, respectively. The opposite directions of each arrow FR, UP, and RH indicate a rear direction, a downward direction, and a leftward direction of the vehicle 100, respectively. Hereinafter, when the description is made simply using terms indicating directions i.e., forward and rearward, right and left, and upward and downward, these mean forward and rearward in the vehicle front-rear direction, right and left in the vehicle right-left direction (vehicle width direction), and upward and downward in the vehicle up-down direction, respectively, unless otherwise specified.

Figure 1:
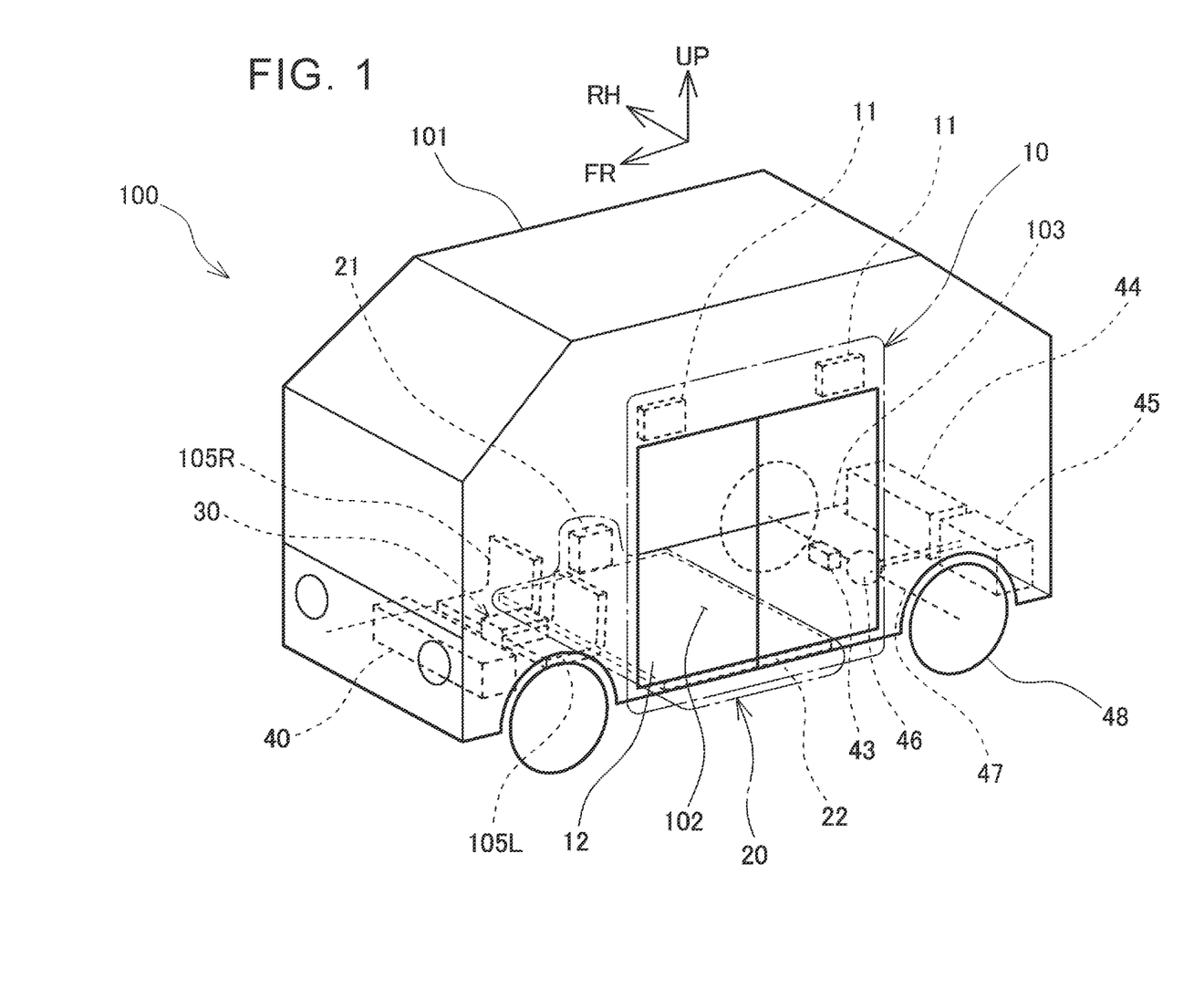
FIG. 1 is a perspective view of a vehicle on which a control device according to an embodiment is mounted, showing a state in which a door is closed and a slope is stored.

In the following description, the vehicle 100 will be described as being driven by an engine 44, but the configuration is not limited thereto. As shown in FIG. 1, the vehicle 100 includes a body 101, a door device 10, a slope device 20, a shift device 30, the control device 40, a vehicle speed sensor 43, the engine 44, a transmission 45, a differential 46, a drive shaft 47, and wheels 48. FIG. 1 shows a state in which a door 12 of the vehicle 100 is closed and the slope 22 is stored.

The body 101 includes a vehicle cabin 102 in which passengers ride and a floor panel 103 constituting the floor of the vehicle cabin 102. The floor panel 103 of the vehicle cabin 102 is flat, and seats (not shown) in which the passengers are seated are disposed in the vehicle cabin 102. Driver's seats 105R, 105L are disposed in the front portion of the vehicle 100, in which the driver or operator is seated.

The engine 44 for driving the vehicle 100 and the transmission 45 is mounted in the rear portion of the body 101. The transmission 45 may be a torque converter type automatic transmission, or may be another type of transmission that generates creep. An output shaft of the engine 44 is connected to the transmission 45, and an output shaft of the transmission 45 is connected to the differential 46. The drive shaft 47 is connected to the differential 46, and the wheels 48 are attached to the distal ends of the drive shaft 47. Further, the vehicle speed sensor 43 for detecting the vehicle speed V from the rotation of the drive shaft 47 is connected to the drive shaft 47.

A door device 10 includes a door 12 that is provided on the side surface of the body 101 and that opens to opposite sides by sliding along the side surface of the body 101, and a door opening and closing mechanism 11 for opening and closing the door 12. The door opening and closing mechanism 11 includes a motor, a gear, and a link therein, performs opening and closing of the door 12, and detects and outputs the opening position of the door 12 from the rotation angle of the motor or the position of the gear or the link.

The slope device 20 is provided on the lower side of the floor panel 103. The slope device 20 includes the plate-shaped slope 22 that is deployed toward the outside of the body 101 in the vehicle width direction, and a slope deployment and storage mechanism 21 for deploying and storing the slope 22. The slope deployment and storage mechanism 21 includes a motor, a gear, and a link therein, performs deployment and storage of the slope 22, and detects and outputs the deploying position of the slope 22 from the rotation angle of the motor or the position of the gear or the link.

The shift device 30 is mounted between the right and left driver's seats 105R, 105L in the front portion of the vehicle 100. The shift device 30 is a device for switching the driving range of the transmission 45 by the operation of the driver or the operator. The control device 40 is also disposed in the front portion of the vehicle 100.

Figure 2:
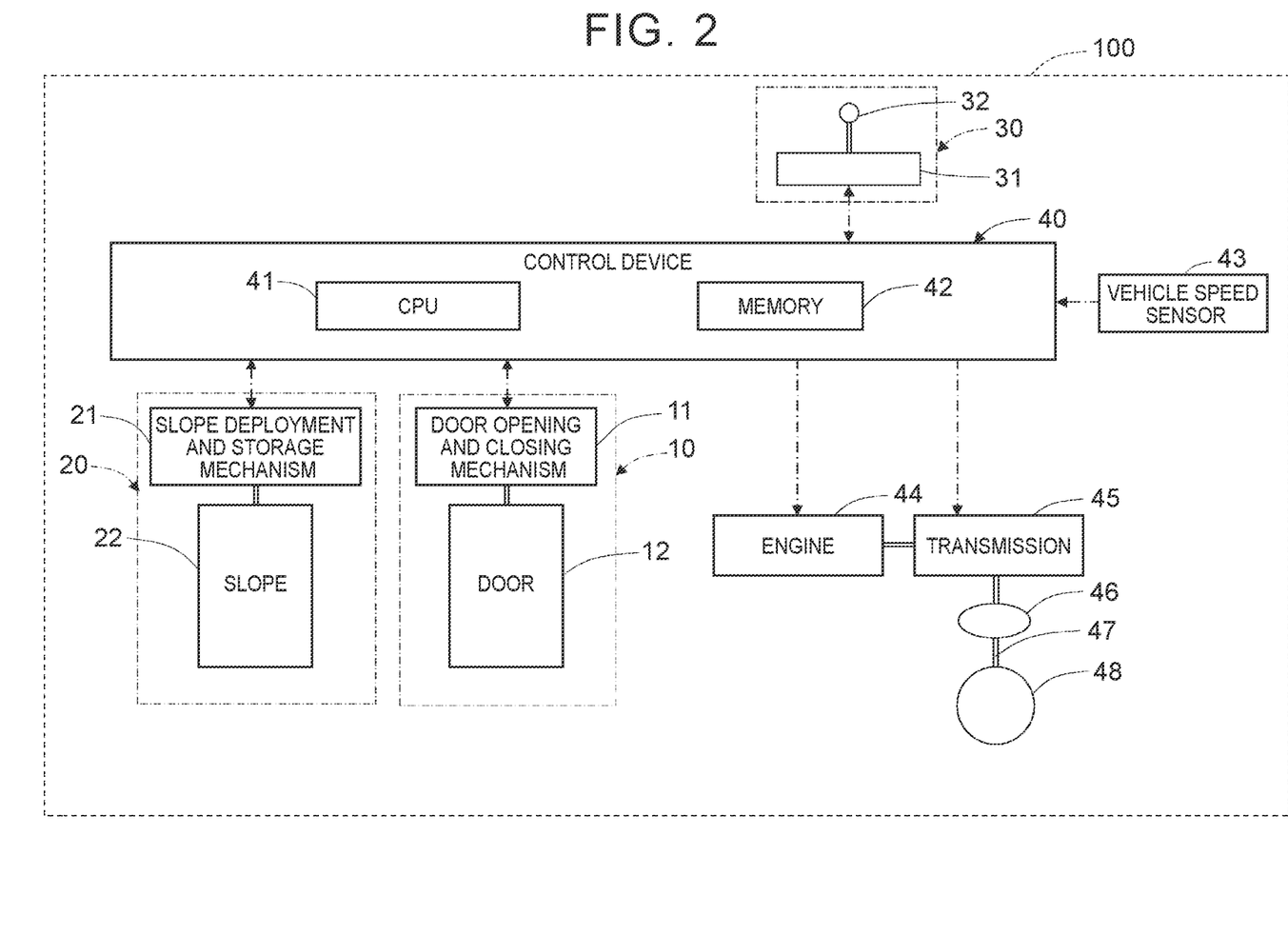
FIG. 2 is a functional block diagram showing a configuration of the vehicle shown in FIG. 1.

As illustrated in FIG. 2, the control device 40 is composed of a computer including a central processing unit (CPU) 41 that is a processor for performing information processing and a memory 42 that stores a control program and control data. The door opening and closing mechanism 11 of the door device 10 and the slope deployment and storage mechanism 21 of the slope device 20 are connected to the control device 40 and operate with commands from the control device 40. The opening degree information of the door 12 detected by the door opening and closing mechanism 11 is input to the control device 40. Similarly, the deployment position information of the slope 22 detected by the slope deployment and storage mechanism 21 is input to the control device 40. The engine 44 and the transmission 45 are also connected to the control device 40 and operate with commands from the control device 40. The vehicle speed information detected by the vehicle speed sensor 43 is also input to the control device 40.

The shift device 30 is composed of a main body 31 that is connected to the control device 40 and a shift lever 32 operated by the driver or the operator. When the driver or the operator operates the shift lever 32, the main body 31 outputs to the control device 40 a driving range signal defining a driving range of the transmission 45, in accordance with the position of the shift lever 32. The control device 40 switches the driving range of the transmission 45 based on the driving range signal input from the shift device 30. Here, the driving range includes a parking range (hereinafter referred to as a P range), a traveling range (hereinafter referred to as a D range), a neutral range (hereinafter referred to as an N range), and a reverse range (hereinafter referred to as an R range). The P range is a range in which the clutch between the engine 44 and the transmission 45 is disengaged to prevent the power of the engine 44 from being input to the transmission 45, and the parking brake is operated. The D range is a range in which the clutch between the engine 44 and the transmission 45 is engaged to cause the power of the engine 44 to be input to the transmission 45, thereby causing the vehicle 100 to travel. The N range is a range in which the clutch between the engine 44 and the transmission 45 is disengaged to prevent the power of the engine 44 from being input to the transmission 45. The R range is a range in which the clutch between the engine 44 and the transmission 45 is engaged to cause the power of the engine 44 to be input to the transmission 45, thereby causing the vehicle 100 to travel backward.

Figure 3:
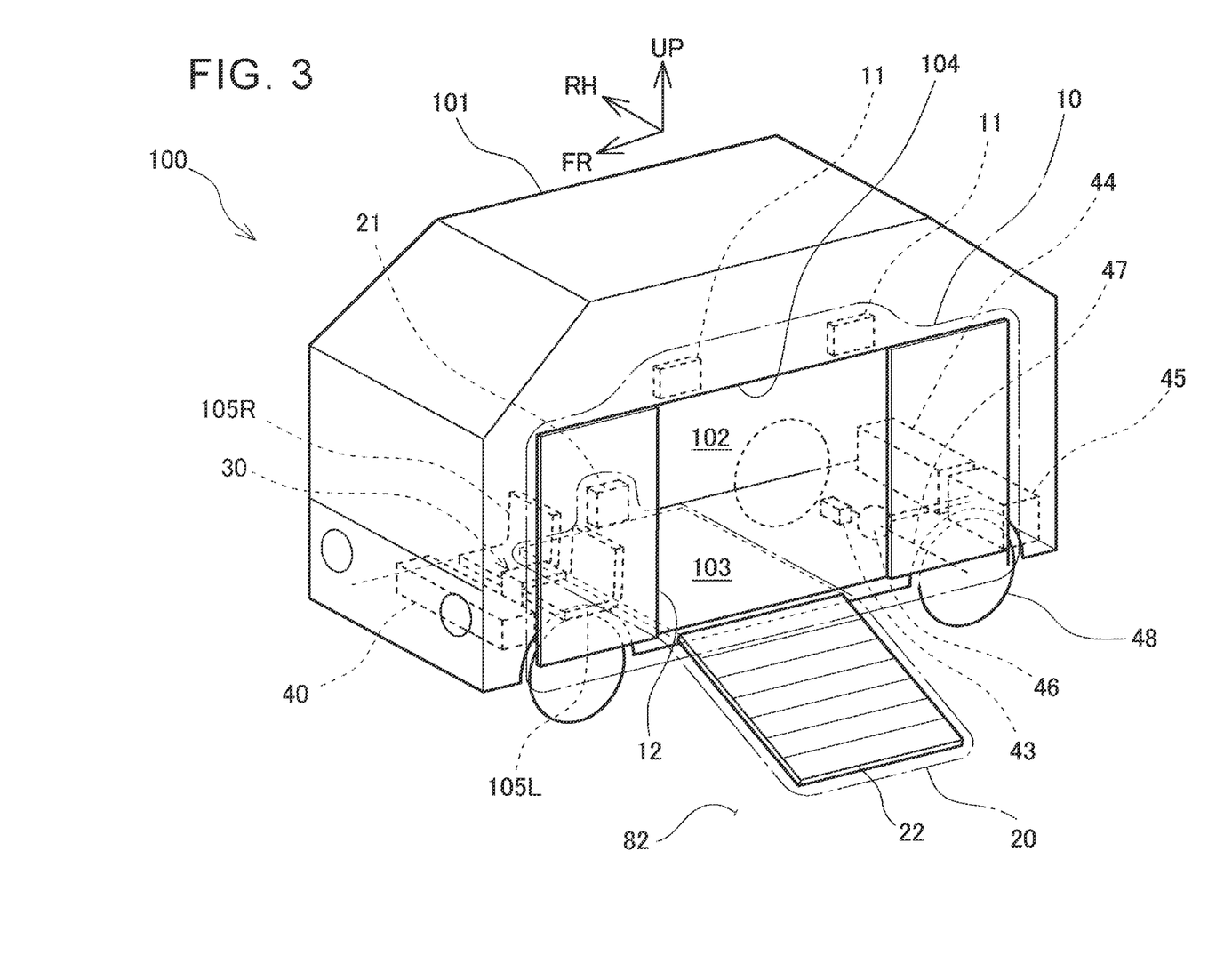
FIG. 3 is a perspective view showing a state in which the door of the vehicle shown in FIG. 1 is opened and the slope is deployed.

As shown in FIG. 3, when the vehicle 100 is stopped and the passengers get on and off, the control device 40 opens the door 12 for ingress and egress of the passengers by the door opening and closing mechanism 11. When the door 12 is opened, an entrance and exit 104 from which the passengers get on and off and the vehicle cabin 102 with a flat floor appear. Further, when the vehicle 100 is stopped and the door 12 is opened, the control device 40 deploys the slope 22 toward the outside of the body 101 in the vehicle width direction by the slope deployment and storage mechanism 21. The deployed slope 22 has an end in contact with a sidewalk 82 from above, and constitutes an ingress and egress passage for guiding the passengers on the sidewalk 82 to the entrance and exit 104 and the floor panel 103 of the vehicle 100. Thus, the control device 40 performs the opening and closing of the door 12 of the entrance and exit 104 from which the passengers get on and off by the door opening and closing mechanism 11, and performs the deployment and storage of the slope 22 for guiding the passengers to the entrance and exit 104 by the slope deployment and storage mechanism 21.

Next, the operation of the control device 40 according to the embodiment will be described with reference to FIGS. 4 and 5.

The CPU 41 of the control device 40 acquires the driving range signal from the shift device 30 and acquires vehicle speed information of the vehicle 100 from the vehicle speed sensor 43. As shown in step S101 of FIG. 4, the CPU 41 determines whether the driving range signal input from the shift device 30 is the P range and the vehicle speed V input from the vehicle speed sensor 43 is lower than a predetermined threshold value VS. Here, the predetermined threshold value VS can be set to any value. To determine that the vehicle 100 is in a stopped state, the predetermined threshold value VS may be set to about 3 km/h, for example.

Figure 4:
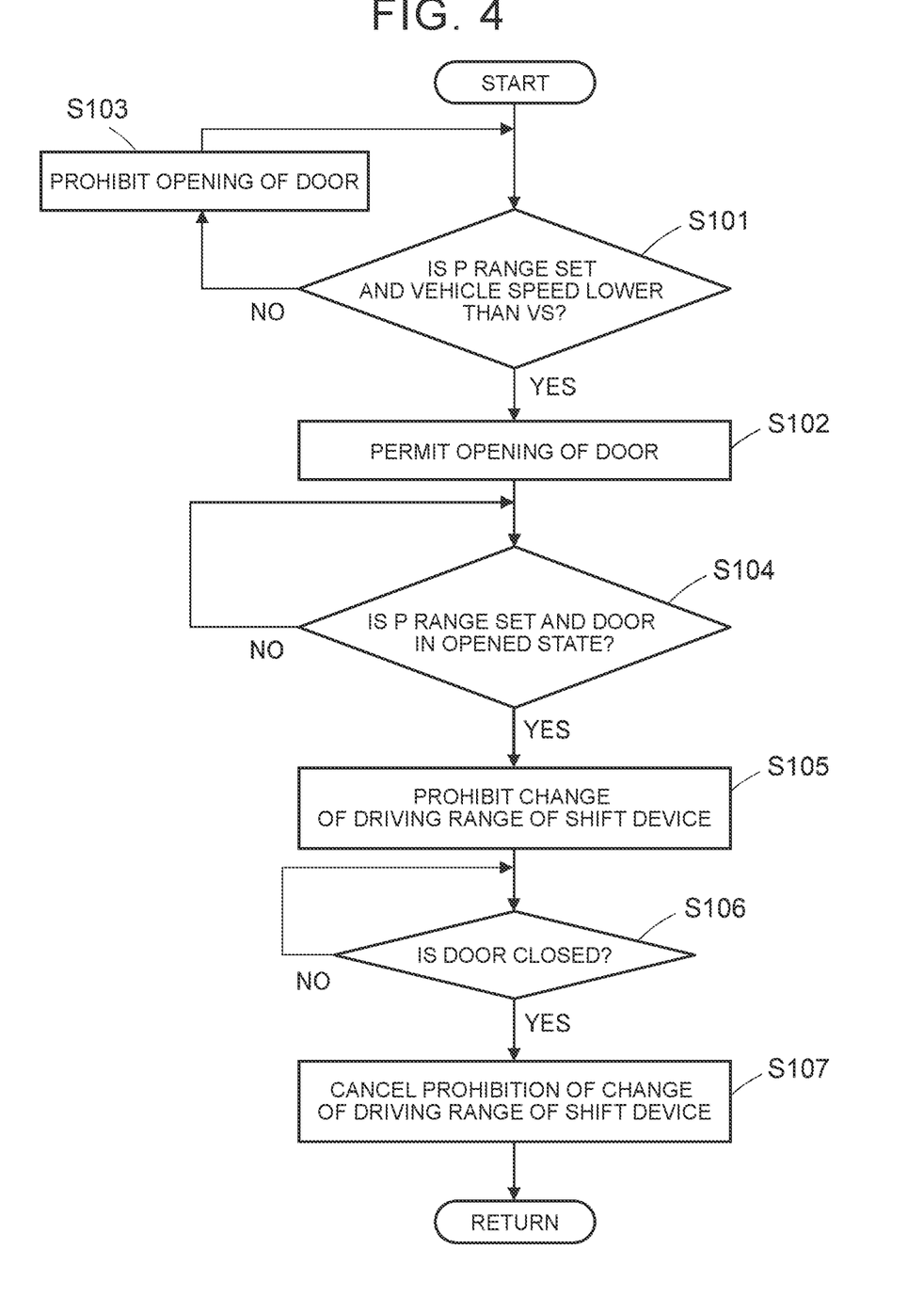
FIG. 4 is a flowchart showing an operation of the control device according to the embodiment.

When the CPU 41 determines NO in step S101 of FIG. 4, the opening of the door is prohibited in step S103 of FIG. 4, and the process returns to step S101 of FIG. 4 to continue monitoring the driving range and the vehicle speed V.

On the other hand, when the CPU 41 determines YES in step S101 of FIG. 4, the process proceeds to step S102 of FIG. 4, and the CPU 41 outputs an opening permission signal for the door 12. Consequently, the CPU 41 acquires the opening degree signal of the door 12 from the door opening and closing mechanism 11 of the door device 10, acquires the driving range signal from the shift device 30, and monitors the opened state of the door 12 and the state of the driving range. Then, in step S104, the CPU 41 determines whether the door 12 is in the opened state and the driving range signal is the P range. When the CPU 41 determines YES in step S104 of FIG. 4, the process proceeds to step S105 of FIG. 4 and the CPU 41 prohibits the change of the driving range of the shift device 30.

Prohibition of the change of the driving range of the shift device 30 can be performed in various ways. For example, a locking mechanism for locking the operation of the shift lever 32 may be provided in the main body 31 to lock the operation of the shift lever 32 by the locking mechanism in accordance with a signal prohibiting the change of the driving range. Further, the P range that is the current driving range may be stored, and the driving range may be maintained in the P range without updating the stored driving range even when the driver operates the shift lever 32.

On the other hand, when the CPU 41 determines NO in step S104 of FIG. 4, the CPU 41 repeatedly executes step S104 and waits while monitoring the opened state of the door 12 and the state of the driving range.

When the CPU 41 prohibits the change of the driving range of the shift device 30 in step S105 of FIG. 4, the process proceeds to step S106 of FIG. 4, and the CPU 41 acquires the opening degree signal of the door 12 from the door opening and closing mechanism 11 to monitor whether the door 12 is closed. When the CPU 41 determines NO in step S106 of FIG. 4, the CPU 41 waits until the door 12 is closed. When the CPU 41 determines YES in step S106 of FIG. 4, the process proceeds to step S107 of FIG. 4, and the CPU 41 cancels the prohibition of the change of the driving range of the shift device 30, thereby terminating the process.

Next, another operation of the control device 40 will be described with reference to FIG. 5. The same operation as that described above with reference to FIG. 4 will be briefly described.

Figure 5:
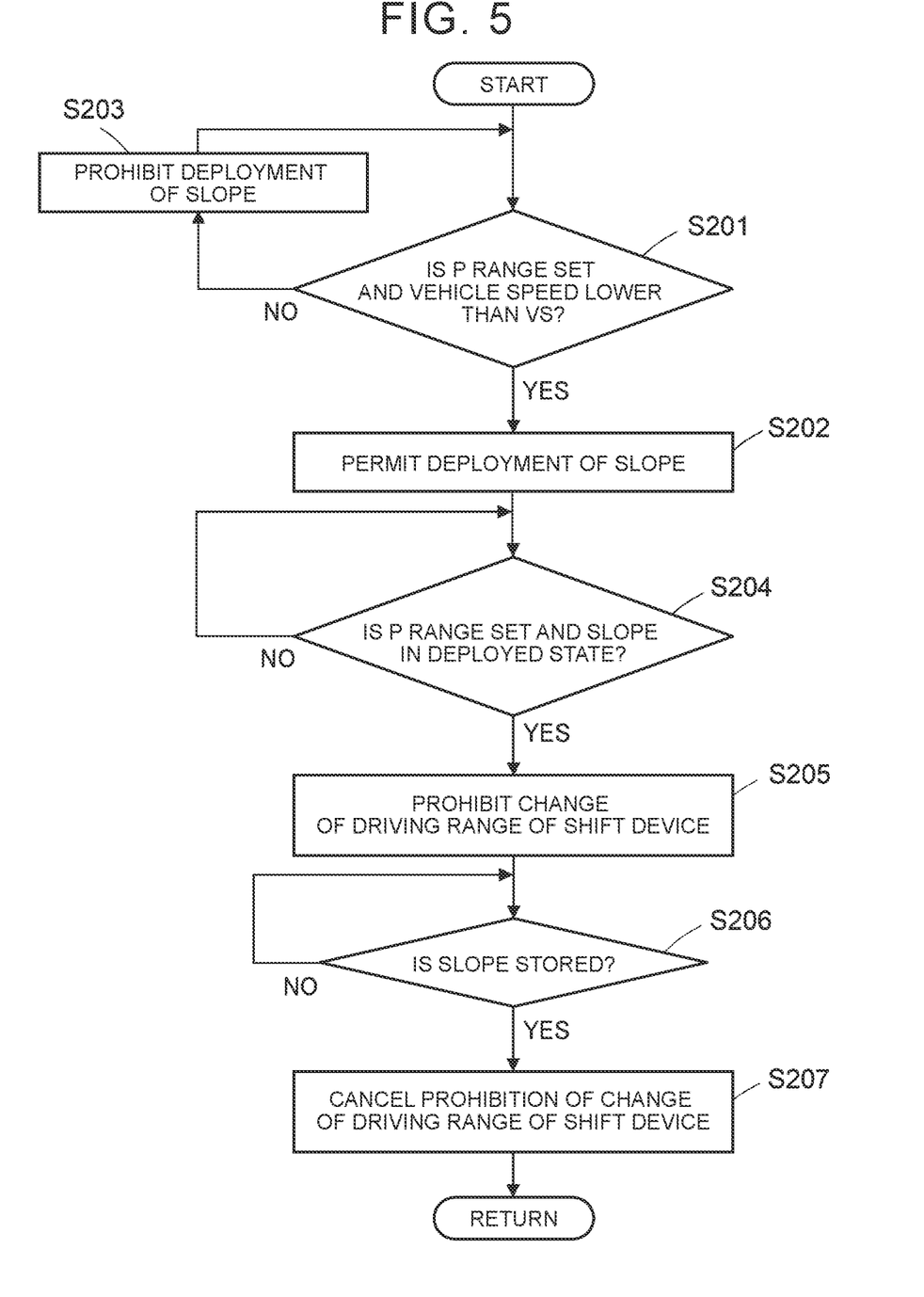
FIG. 5 is a flowchart showing another operation of the control device according to the embodiment.

In the operation shown in FIG. 5, the CPU 41 determines whether the driving range is the P range and the vehicle speed V is lower than the predetermined threshold value VS in step S201 of FIG. 5, similarly to step S101 of FIG. 4. When the CPU 41 determines YES, the CPU 41 permits the deployment of the slope 22 in step S202 of FIG. 5. When the CPU 41 determines NO, the CPU 41 prohibits the deployment of the slope 22 in step S203 of FIG. 5. In step S204 of FIG. 5, the CPU 41 determines whether the driving range is the P range and the slope 22 is in the deployed state, based on the slope deployment position signal from the slope deployment and storage mechanism 21. When the CPU 41 determines YES, the CPU 41 prohibits the change of the driving range of the shift device 30 in step S205 of FIG. 5. When the slope 22 is stored in step S206 of FIG. 5, the CPU 41 cancels the prohibition of the change of the driving range of the shift device 30 in step S207.

As described above, when the driving range is the P range and the door 12 is in the opened state, the control device 40 of the vehicle 100 prohibits the change of the driving range of the shift device 30, thereby prohibiting the operation of the driving range from the P range to other ranges. This can suppress the driving range from being changed to the D range, the R range, or the like when the door 12 is in the opened state, which suppresses the vehicle 100 from traveling due to creep when the door 12 is in the opened state. Further, the control device 40 prohibits the change of the driving range of the shift device 30 when the driving range is the P range and the slope 22 is in the deployed state. This can suppress the driving range from being changed to the D range, the R range, or the like when the slope 22 is in the deployed state, which suppresses the vehicle 100 from traveling due to creep when the slope 22 is in the deployed state. Further, when the driving range is the P range and the vehicle speed V input from the vehicle speed sensor 43 is lower than the predetermined threshold value VS, the control device 40 permits the opening of the door 12 or the deployment of the slope 22. Therefore, it is possible to reliably detect that the vehicle 100 is in the stopped state, which can suppress misoperation.

Next, another operation of the control device 40 will be described with reference to FIGS. 6 and 7. Operations similar to those described above with reference to FIGS. 4 and 5 are denoted by the same reference signs, and descriptions thereof are omitted.

Figure 6:
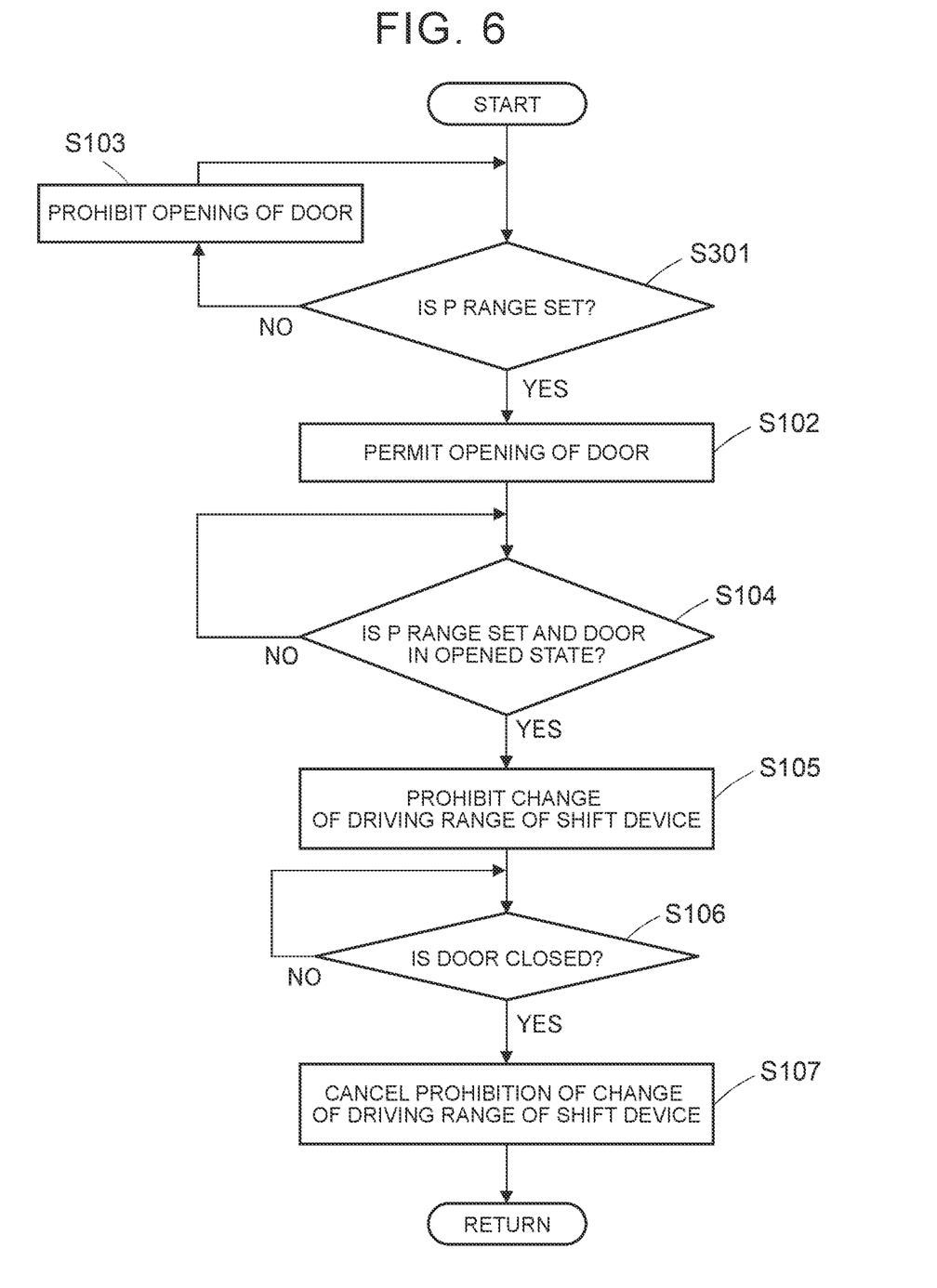
FIG. 6 is a flowchart showing another operation of the control device according to the embodiment.

The operation shown in FIG. 6 is the same as the operation shown in FIG. 4, except that the CPU 41 of the control device 40 permits the opening and closing of the door 12 when the driving range is the P range in step S301. Thus, even when there is no input of the vehicle speed V from the vehicle speed sensor 43, the change of the driving range of the shift device 30 is prohibited when the driving range is the P range and the door 12 is in the opened state, thereby prohibiting the operation of the driving range from the P range to other ranges. This can suppress the vehicle 100 from traveling due to creep when the door 12 is in the opened state.

Figure 7:
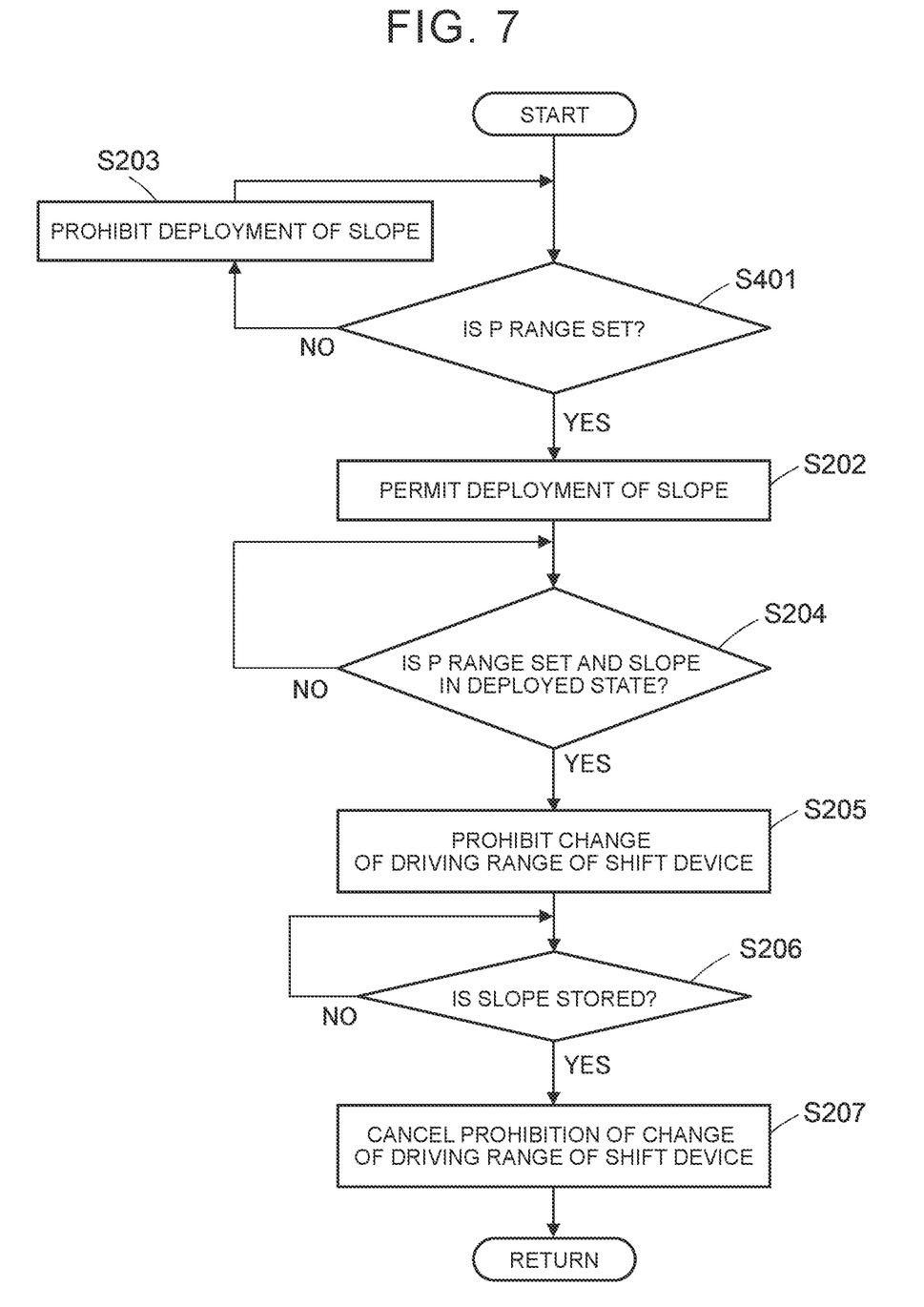
FIG. 7 is a flowchart showing another operation of the control device according to the embodiment.

The operation shown in FIG. 7 is the same as the operation shown in FIG. 5, except that the CPU 41 of the control device 40 permits the deployment of the slope 22 when the driving range is the P range in step S401. Thus, even when there is no input of the vehicle speed V from the vehicle speed sensor 43, the change of the driving range of the shift device 30 is prohibited when the driving range is the P range and the slope 22 is in the deployed state, thereby prohibiting the operation of the driving range from the P range to other ranges. This can suppress the vehicle 100 from traveling due to creep when the slope 22 is in the deployed state.

In the above description, the vehicle 100 has been described as being driven by the engine 44. However, the configuration is not limited thereto, and the vehicle 100 may be driven by a driving motor.

What is claimed is:

1. A control device mounted on a vehicle including a door opening and closing mechanism for opening and closing a door of an entrance and exit where a passenger gets on and off, the control device having a central processing unit, and a shift device having a shift lever for changing a driving range of a transmission, the control device being configured to be input with the driving range and open and close the door by the door opening and closing mechanism, wherein the control device:
    permits opening of the door when the driving range is a parking range,
    prohibits a change of the driving range of the shift device when the driving range is the parking range and the door is open,
    is mounted on the vehicle further including a slope deployment and storage mechanism for deploying and storing a slope that guides the passenger to the entrance and exit,
    further performs deployment and storage of the slope by the slope deployment and storage mechanism,
    permits the deployment of the slope when the driving range is the parking range, and
    prohibits the change of the driving range of the shift device when the driving range is the parking range and the slope is in a deployed state.

2. The control device according to claim 1, wherein when a vehicle speed is input from a vehicle speed sensor mounted on the vehicle, and the driving range is the parking range and the vehicle speed is lower than a predetermined threshold value, the control device permits the opening of the door.

3. The control device according to claim 1, wherein when a vehicle speed is input from a vehicle speed sensor mounted on the vehicle, and the driving range is the parking range and the vehicle speed is lower than a predetermined threshold value, the control device permits the deployment of the slope.

4. A vehicle comprising:
    a door opening and closing mechanism for opening and closing a door of an entrance and exit where a passenger gets on and off;
    a shift device having a shift lever for changing a driving range of a transmission;
    a slope deployment and storage mechanism for deploying and storing a slope that guides the passenger to the entrance and exit; and
    a control device having a central processing unit to which the driving range is input and that opens and closes the door by the door opening and closing mechanism, wherein the control device:
    permits opening of the door when the driving range is a parking range,
    prohibits a change of the driving range of the shift device when the driving range is the parking range and the door is open
    performs deployment and storage of the slope by the slope deployment and storage mechanism,
    permits the deployment of the slope when the driving range is the parking range, and
    prohibits the change of the driving range of the shift device when the driving range is the parking range and the slope is in a deployed state.

5. The vehicle according to claim 4, further comprising a vehicle speed sensor, wherein when a vehicle speed is input from the vehicle speed sensor, and the driving range is the parking range and the vehicle speed is lower than a predetermined threshold value, the control device permits the opening of the door.

6. The vehicle according to claim 4, further comprising a vehicle speed sensor, wherein when a vehicle speed is input from the vehicle speed sensor, and the driving range is the parking range and the vehicle speed is lower than a predetermined threshold value, the control device permits the deployment of the slope.

* * * * *